United States Patent [19]

Ueda et al.

[11] 3,791,276
[45] Feb. 12, 1974

[54] LIGHT MEASURING APPARATUS FOR CAMERA SHUTTER CONTROL MECHANISMS

[75] Inventors: Hiroshi Ueda, Nara; Takeshi Egawa, Kainan, both of Japan

[73] Assignee: Minolta Camera Kabushiki Kaisha, Osaka-fu, Japan

[22] Filed: June 4, 1971

[21] Appl. No.: 149,939

[52] U.S. Cl............................ 95/42, 95/53 R, 95/55
[51] Int. Cl. ............................................ G03b 19/12
[58] Field of Search ..... 95/10 C, 10 CT, 10 PO, 42, 95/53 R, 55

[56] References Cited
UNITED STATES PATENTS
3,124,049   3/1964   Ball................................ 95/10 CT
3,353,462   11/1967  Suzuki............................ 95/10 CT Primary Examiner—Samuel S. Matthews
Assistant Examiner—Richard A. Wintercorn
Attorney, Agent, or Firm—Watson, Cole, Grindle & Watson

[57] ABSTRACT

In a single lens reflex camera having a focal plane shutter with a light reflecting surface, the light receptive elements are mounted outside of the direct light path from the objective lens to the film so as to receive light reflected from both the film and the light reflecting surface of the focal plane shutter. Structure is mounted to block selected light rays reflected from the film and/or the light reflecting surface of the focal plane shutter.

5 Claims, 10 Drawing Figures

INVENTOR.
HIROSHI UEDA
BY TAKESHI EGAWA

WATSON COLE GRINDLE & WATSON
ATTORNEYS

LIGHT MEASURING APPARATUS FOR CAMERA SHUTTER CONTROL MECHANISMS

BACKGROUND OF THE INVENTION

The present invention relates to an automatic exposure camera of the photometric type wherein light rays passing through the objective lens are measured to effect exposure control, which is kown as a "through the lens" type, and more particularly to an improvement of the photometric device in a camera of the type in which the reflection factor of the first screen of the shutter is made the same as the reflection factor of the light sensitive surface of the film of an object from the starting of the first screen of the shutter to the exposure of the photosensitive material is performed by a light receptive element mounted in front of the light sensitive film surface and outside of the light path of photographic light and thereby the exposure control is effected.

This applicant has filled U.S. Patent Application Ser. No. 89406 of a TTL type camera on 13 Nov, 1970, in which the reflection factor on the plane of the side facing the objective lens of the first screen of a focal plane shutter is set to be nearly the same as the reflection factor of the light sensitive film surface a light receptive element mounted so as to be capable of receiving the reflected light rays from the first screen and the surface of the light receptive element yet outside of the light path of photographic light from the objective lens to the film surface. The exposure time control device starts its operation simultaneously with the start of the first screen and controls the starting time of the second screen by a signal from the photometric device.

However, the light receptive element of the photometric device in the invention of Patent application Ser. No. 89406 receives irregular reflection light from the surface of the first screen of the shutter and all portions of the surface of the film and at the same time receives also regular reflection light from those elements. Therefore, the output of the light receptive element is influenced by regular reflection light and as a result the whole illuminance on the focal plane of the camera can not be obtained exactly. Thus, when the illuminance of the whole picture is uniform there is no trouble, however, when it is not uniform even though the average illuminance on the whole picture is the same the light value of the light receptive element becomes different on account of the difference of the illuminance distribution on the reflecting surface.

OBJECTS OF THE INVENTION

One object of the present invention is to remove the drawbacks mentioned above and provide in cameras of the type specified apparatus in which regular reflection light from the first screen of the shutter and the position of the photosensitive film surface area not received by the light receptive element of the photometric device.

Another object of the present invention is to provide in cameras of the type specified a shading member in the incident light path to the light receptive element in order that regular reflection light from the first screen of the shutter and the film surface is not received by the light receptive element of the photometric device.

Further another object of the present invention is to provide a TTL photometric type camera in which the light receptive element of the photometric device in the camera is disposed so tha regular reflection light from the first screen of the shutter and the specific position of the film is not received by the light receptive element of the photometric device and illuminance of the whole picture can be correctly measured.

Still further another object of the present invention is to provide a TTL photometric type camera capable of measuring reflected light rays from all portions of the picture.

SUMMARY OF THE INVENTION

The present invention is constructed so as not to allow the light receptive element of the photometric device to receive regular reflection light erroneously affecting the correct photometry of the reflected light rays from the first screen plane and the surface of the film. By providing a shading member for shutting off regular reflection light in front of the light receptive element in order to measure the illuminance of the whole picture exactly or specifying the mounting location of a light receptive element relative to the optical axis of the objective lens and the position of the film to prevent the regular reflection light component from the first screen plane and the surface of the film, which adversely affects photometric result, from reaching the light receptive element.

Further, according to the present invention it is possible to measure reflected light rays from all portions of the picture by mounting two light receptive elements symmetrically relative to the optical axis of the objective lens.

DESCRIPTION OF THE PREFERRED EMBODIMENT

Figure 1:
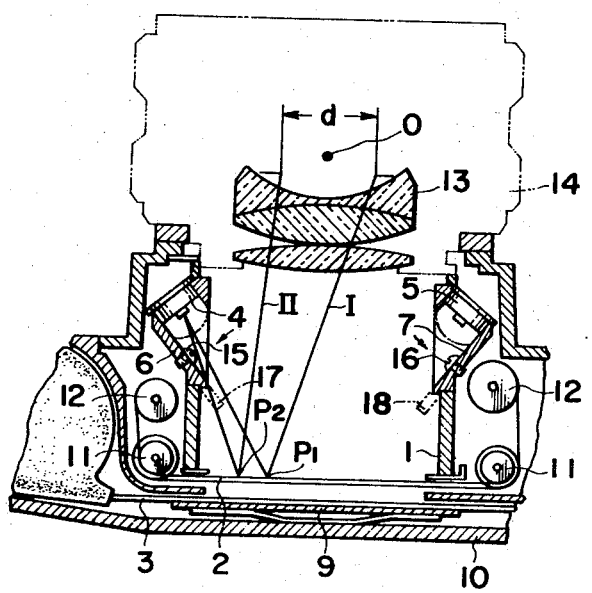
FIG. 1 is a sectional view of a single lens reflex camera with an embodiment in accordance with the present invention.

To the accompanying drawings the present invention will be described. FIG. 1 shows a single lens reflex camera provided with a focal plane shutter, wherein reference numeral 1 denotes the first screen of the focal plane shutter, 2 the second screen thereof, and 3 a film material supported by film pressing plate 9 provided on the back cover of the camera. Numerals 4, 5 are respectively a photosensitive element of the photometric device, which are respectively mounted in holders 6, 7 and disposed in front of film material 3 and outside of the light path of photographic light rays from objective lens 13 to film material 3 so as to receive the reflected light rays from the first screen plane 1 and the film plane of photosensitive material 3.

Numerals 11, 12 are respectively winding drums for the first and second screens of the shutter, which are energized to turn clockwise by a spring not shown in the drawing. Numeral 13 denotes an objective lens. Point O denotes the center of the exit pupil of objective lens 13 and d denotes the diameter of the opening of the exit pupil. Numeral 14 denotes a lens barrel.

In such a construction when the diameter of the opening of the exit pupil is d, the paths of light rays incident upon light receptive element 4 being regularly reflected at reflection points $P_1$ and $P_2$ of the first screen plane and the photosensitive plane 1 of film material 3 passing through the edge of the exit pupil are shown by I and II respectively.

Also, in FIG. 1 light rays are shown in the state reflected by the first screen 1, and also as reflected by the film material 3. First screen 1 and film material 3 are very close to each other so that nearly the same light paths are taken.

Figure 2:
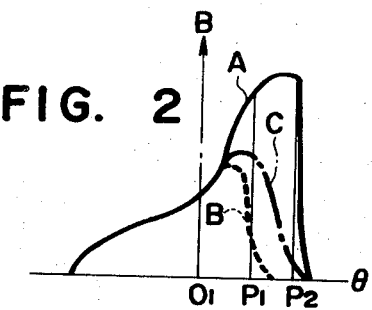
FIG. 2 shows the distribution of the reflection brightness on the image forming plane of a camera as seen from the light receptive element.

FIG. 2 is a graph of relative intensity of reflected light incident on the photocell in accordance with the reflecting position on the reflecting surface of the first screen or the light sensitive surface of the film which is illuminated by light rays passing through the objective lens, wherein the abscissa indicates reflecting positions and the ordinate indicates the intensity. Full line A shows the brightness distribution at the time when the first screen 1 and the surface of film material 3 are irradiated by light rays passing through objective lens 13 as seen from light receptive element 4. In this FIG. 2, $P_1$ and $P_2$ are the same as reflection points $P_1$ and $P_2$ in FIG. 1, and the reason why the reflection brightness forms a peak between points $P_1$, $P_2$ is that the regular reflection light is received by light receptive element 4 between reflection points $P_1$, $P_2$.

In the present invention, in order to remove the effect of regular reflection light at reflection points $P_1$, $P_2$ on light receptive element 4, edges 17, 18 of cylindrical holders 6, 7 are projected so as to shut off light paths I, II.

Dotted line B in FIG. 2 shows the brightness distribution of the first screen 1 and the surface of film material 3 as seen from light receptive element 4 with projected edges 17, 18 on cylindrical holders 6, 7 as described above. The peak effected by the regular reflection component is gone. By properly adjusting the length of projection of projected edges 17, 18 the brightness distribution shown by the dotted line in FIG. 2 becomes symmetrical as shown by chain line C. In this case, projected edges 17, 18 of cylindrical holders 6, 7 are designed to receive partially without shutting off all of light rays on reflection light paths I, II from the space between reflection points $P_1$, $P_2$ as described hereinafter.

Figure 3:
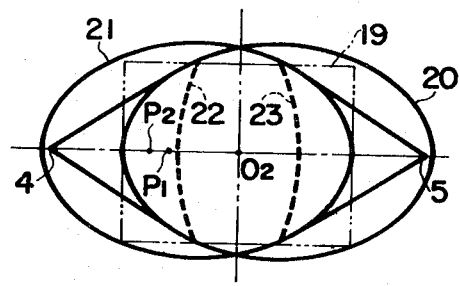
FIG. 3 shows the field of view of the image forming picture as seen from the light receptive element.

FIG. 3 shows the field of view as seen from light receptive elements 4, 5 towards the first screen 1 and film material 3, wherein numeral 19 denotes the size of the picture. And, the full line in FIG. 3 shows the field of view in the case wherein in FIG. 1 cylinder holders 6, 7 are not provided with projected edges. The ellipse 20 shows the field of view of light receptive element 4 and ellipse 21 shows the field of light receptive element 5. The dotted line in FIG. 3 shows the field of view in the case wherein cylindrical holders 6, 7 are provided with projected edges 17, 18, so that the field of view of light receptive element 4 is to that shown by dotted line 22 and the field of view of light receptive element 5 is as shown by dotted line 23. Therefore, by providing projected edges 17, 18 on cylindrical holders 6, 7 regular reflection points $P_1$, $P_2$ of light paths I, II are screened from the field of view of light receptive elements. However, light receptive elements 4, 5 are mounted symmetrically relative to the optical axis $O_2$ of the camera, so that the first screen 1 and the surface of the film material screened from the field of view of one of the elements are seen by the other light receptive element, so that the entire plane of first screen 1 and the surface of film material 3 can be observed.

The exposure control effected by the shutter speed control is desirable to be performed with the photometric value of the average illuminance of the whole picture or the photometric value weighted on the central illuminace of the picture, so that for the conditions having the peak as shown by the full line A in FIG. 2, when measuring the conditions having no peak as shown by chain line C and measuring the central brightness of the picture, the exposure control can be properly effected.

Figure 4:
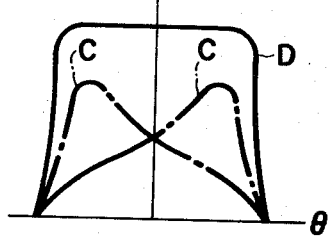
FIG. 4 shows the distribution of the combined brightness on the image forming plane in the case wherein two light receptive elements are symmetrically used.

As shown in FIG. 1, when light receptive elements 4, 5 are mounted symmetrically relative to the optical axis of the objective lens, the brightness distribution curve symmetrical with that shown in FIG. 2 can be obtained relative to light receptive element 5. The brightness distribution of the picture seen from light receptive elements 4, 5 becomes distribution curve D as shown in FIG. 4 which is the addition of curves C shown by the chain line in FIG. 2, so that the exposure control can be more exactly effected as well. The abscissa and the ordinate of FIG. 4 show respectively reflecting position on the reflection plane and the brightness in the same way as in FIG. 2. In order to make curve D flat it is only required to transmit partially as shown in FIG. 1 without shutting off all of light rays incident upon light receptive element 4 from points $P_1$, $P_2$.

In order to shut off regular reflection light incident upon light receptive elements 4, 5 the edges of cylindrical holders 6, 7 are provided. However, as another embodiment screws 15, 16 can be provided on the inside of cylindrical holders 6, 7 so as to locate their heads in the position to shut off the regular reflection light as shown by the full lines in FIG. 1. Cylindrical holders 6, 7 are respectively in a cylindrical form and diagonally cut as shown in FIG. 1, so that by removing objective lens 13, screws 15, 16 can be adjusted easily and precisely in the direction shown by the arrows.

Besides, in order to shut off the regular reflection light, projected edges 17, 18 of cylindrical holders 6, 7 can be preferably an opaque member or a light absorbing member.

Figure 5:
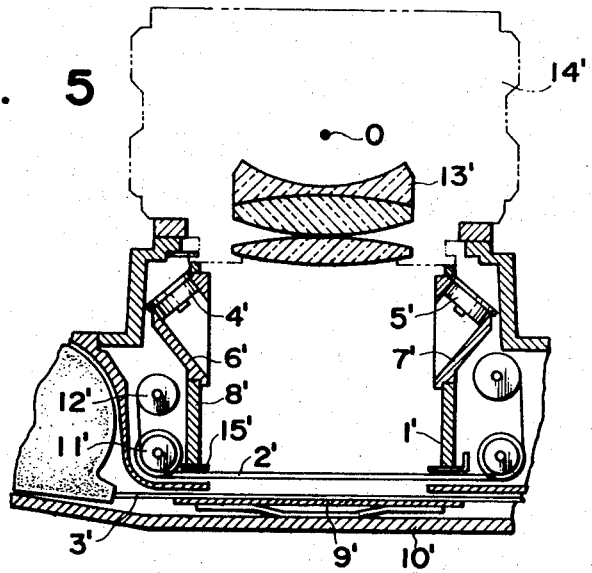
FIG. 5 is a sectional view of a single lens reflex camera of another embodiment in accordance with the present invention.

In order to exclude the regular reflection light from the first screen and the film material, instead of providing the shading member path incident upon the photosensitive element as described, the mounting location of the light receptive element of the photometric device may be changed. FIG. 5 is the same drawing as FIG. 1 showing a single lens reflex camera, wherein reference numeral 1' denotes the first screen of the focal plane shutter, 2' the second screen of the shutter, 3' a film material, and 4', 5' are respectively a light receptive element. Light receptive elements 4', 5' are respectively fitted in holders 6', 7' and mounted in a direction and location capable of receiving the reflected light rays from the first screen 1' and the surface of film material 3' and outside of the light path of objective light rays from photographic lens 13' to film material 3' and yet in a position on each in the direction of the long side of the picture in mirror box 8'.

Numeral 9' denotes a film pressing plate, 10' a back cover of the camera, 11' and 12' are respectively winding drums for the first screen 1' and the second screen 2', 14' is a lens barrel and 15' is a picture frame.

Figure 6:
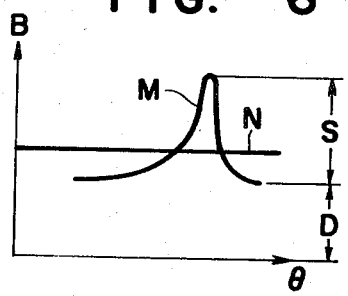
FIG. 6 shows the distribution of the reflection brightness on the image forming plane of a camera as seen from the light receptive element.

FIG. 6 shows the reflecting brightness distribution characteristics appearing on the film as seen from the light receptive element, wherein the reflecting position of the film is shown on the abscissa and the brightness is shown on the ordinate. Curve N shows the perfect reflection brightness distribution characteristic and curve M shows the reflection brightness distribution characteristic on the reflection plane of the film including the regularly reflected light. Level D of curve M is an irregular reflection component of the inner diffusion of the layer in conformity with the diffusion of light effected by fine grains of substances in the different refractive index in the emulsion layer of the film material. Portion S is a reflection component of the surface scattering of the emulsion layer and formed of irregular reflection and regular reflection components, and the regular reflection component forms the peak. Also in the case of wherein the reflection factor of the first screen 1' is treated in the same manner as the reflection facator of the surface of photosensitive material 3' the same tendency as described above is indicated.

Figure 7:
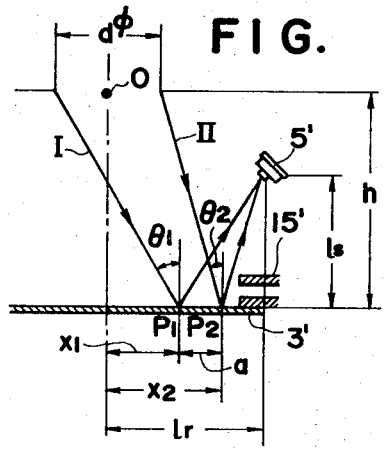
FIG. 7 is a plan view of the right half of light path in the photometric device and a light receptive element.

FIG. 7 shows the light path of the right half of the photometric device shown in FIG. 5. Point O shows the central position of the exit pupil of objective lens 13'. I and II show light paths of a regular reflection component along which photographic light rays emitted from the exit pupils are reflected by the surface of film material 3' to enter light receptive element 5'. $P_1$ and $P_2$ show respectively reflection points of light paths I, II on the surface of film material 3'.

Figure 8:
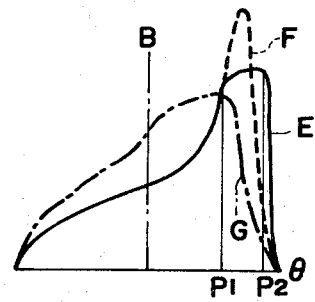
FIG. 8 shows the distribution of the reflection brightness on the image forming plane as seen from the light receptive element on the right side of a photometric device.
Figure 9:
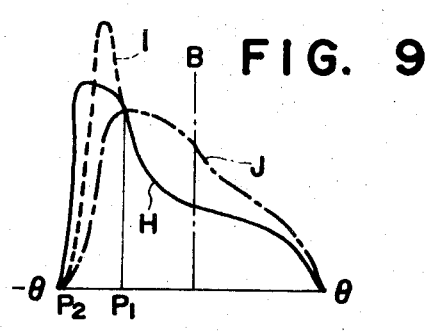
FIG. 9 shows the distribution of the reflection brightness on the image forming plane as seen from the light receptive element on the left side of the same photometric device as that shown in FIG. 8.

The relative generated current of light receptive element 5' corresponding to the reflecting brightness distribution on the reflecting surface in FIG. 7 is shown in FIG. 8 in which the absicissa shows the reflecting position on the reflecting surface of the first screen and the surface of the film material and the ordinate shows the brightness. In FIG. 8, as shown by characteristic curve E, reflection points $P_1$, $P_2$ on the surface of film material 3 show the peak effected by regular reflection light. That peak becomes extensive as shown by curve F as dimension d in FIG. 7 gets smaller, that is, the space between $P_1$ and $p_2$ gets smaller. The peak shows that light receptive element 5' responds to the reflected light between $P_1$ and $P_2$ in FIG. 7, and this fact is not desirable for the purpose of measuring the illuminance of the whole of picture and accordingly inappropriate for the photometric device. Thus, if the space betwen $P_1$ and $P_2$ can be widened, the peaks in curves E and F in FIG. 8 are separated and the nearer $P_1$ and $P_2$ are brought to the center of the picture, the nearer curves E and F approach a symmetrical form relative to the center of picture. Therefore, it is possible to impartially measure the reflected light from all portions of the picture. For this purpose, it is desirable that light receptive element 5' is removed from film material 3' and brought close to the optical axis of lens 13'. Curve G in FIG. 8 shows the case wherein light receptive element 5' is brought to the location described above as near as possible, the local peaks are decreased and accordingly this fact improves the operation of the photometric device. Also with respect to light receptive element 4' shown in FIG. 5 the same consideration applies, and as shown in FIG. 9 curve H corresponds to curve E, curve i to curve E, and curve J to cufve G. These curves show the brightness distribution on the picture seen from light receptive 4' respectively.

Figure 10:
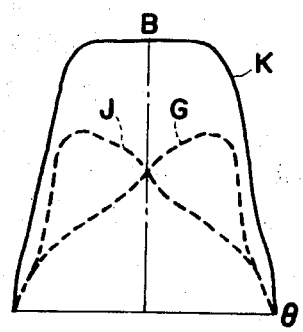
FIG. 10 shows the distribution of the combined reflection brightness on the image forming plane in the case wherein two light receptive elements are used.

Further, when the shutter control is arranged to be effected by the sum of the outputs of light receptive elements 4', 5', the brightness distribution on the picture seen from those elements is equivalent, as shown in FIG. 10, to that shown by curive K which is the sum of curve G and curve J. It shows that the reflected light from all portions of the picture is impartially measured.

Now, in order to obtain the locations of $P_1$ and $P_2$ in FIG. 7, namely, calculate $X_1$, $X_2$, a, provided that:

d — diameter of the exit pupil,
 h — distance between the surface of the film material and the position of the exit pupil,
 $l_r$ — distance between the optical axis and the light receptive element,
 $l_s$ — distance between the surface of the film material and the light receptive element,
 $X_1$ — distance between the optical axis and $P_1$,
 $X_2$ — distance between the otpical axis and $P_2$,
 $\theta_1$ — incident angle of light path I,
 $\theta_2$ — incident angle of light path II,
 the following formulas may be established:

$$\tan \theta_1 = [X_1 + (d/2)/h] = (1_r - X_1)/1_s \quad (1)$$
$$\tan \theta_2 = [X_2 - (d/2)/h] = (1_r - X_2)/1_s \quad (2)$$
$$\text{from formula (1)} \quad X_1 = [h1_r - 1_s (d/2)/1_s - h] \quad (3)$$
$$\text{from formula (2)} \quad X_2 = [h1_r + 1_s(d/2)/1_s + h] \quad (4)$$

from formulas (3) and (4)

$$X_2 - X_1 = (1_s + d/1_s + h) \quad (5)$$

Therefore, provided $X_2 - X_1 = a$ $$a = d - (hd/1_s + h) \quad (6)$$

d is the diameter of the exit pupil of objective lens 13' and h is fixed in accordance with the focal distance, so that d and h are supposed to be constant and in order to increase a as far as possible, namely, separate $P_1$ and $P_2$ from each other, it is only required to increase $1_s$ in formula (6) as far as possible. And, in order to decrease $X_1 + X_2$ as far as possible, namely, bring $P_1$ and $P_2$ close to the center of the picture as far as possible, it is only required to decrease $l_r$ in formulas (3) and (4) as far as possible.

Since the present invention is constructed as described above, in the case wherein the exposure control is effected by measuring the brightness on the shytter screen and the surface of the film material being irradiated by the light rays passing through the objective lens, it is possible to decrease the regular reflection light component from the shutter screen and the surface of the film material by providing a shading member for the light receptive elements or selecting the mounting location of the light receptive elements.

The embodiment described above is for a camera provided with a focal plane shutter, however, it is apparent that the present invention can be applied also in the case of effecting exposure control by measuring the reflected light rays from the plane of the film material, in cameras provided with shutters of other types.

What is claimed is:

1. In a single lens reflex camera having a focal plane shutter with a light reflecting surface and an objective lens, the improvement comprising:
   at least two light receptive elements mounted outside of the direct light path from said objective lens to the light sensitive surface of the film for receiving light reflected from said light sensitive surface and/or said light reflecting surface of said focal plane shutter for generating respective signals in accordance with the reflected light incident thereon; and
   means for blocking selected light rays reflected from said light sensitive surface and/or the surface of said focal plane shutter.

2. Apparatus as in claim 1 further comprising cylindrically shaped members for mounting each of said at least two light receptive elements and wherein said means for blocking is a slidable extension of the surface of said cylindrically shaped members and includes means for retaining said means for blocking in a given position.

3. Apparatus as in claim 1 further comprising means for mounting each of said at least two light receptive elements, and said means for blocking comprises a member integral with said means for mounting and extending therefrom for blocking a portion of said light rays reflected from said light sensitive surface and/or said light reflecting surface.

4. Apparatus as in claim 1 wherein said at least two light receptive elements are mounted symmetrically relative to the optical axis of said objective lens.

5. In a single lens reflex camera having a focal plane shutter with a light reflecting surface, an objective lens, the aperture of said objective lens has a diameter $d$, and the focal distance is $h$, the improvement comprising:
   means for mounting at least two light receptive elements symmetrically with respect to the optical axis of said objective lens outside of the direct light path from said objective lens to the light sensitve surface of a film and for receiving light reflected from said light sensitive surface and/or said light reflecting surface of said focal plane shutter; and
   wherein one of said at least two light receptive elements is mounted a distance LR from the optical axis of said objective lens and a disance LS normal to the surface of said focal plane shutter wherein LS and LR are selected so that LR and LS are respectively minimum and maximum distances.

* * * * *